United States Patent
Chui

(10) Patent No.: US 7,667,884 B2
(45) Date of Patent: Feb. 23, 2010

(54) INTERFEROMETRIC MODULATORS HAVING CHARGE PERSISTENCE

(75) Inventor: Clarence Chui, San Mateo, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 321 days.

(21) Appl. No.: 11/586,800

(22) Filed: Oct. 26, 2006

(65) Prior Publication Data

US 2007/0041079 A1 Feb. 22, 2007

Related U.S. Application Data

(63) Continuation of application No. 11/205,268, filed on Aug. 15, 2005, now Pat. No. 7,136,213.

(60) Provisional application No. 60/613,420, filed on Sep. 27, 2004.

(51) Int. Cl.
*G02B 1/01* (2006.01)
(52) U.S. Cl. .................................... 359/291; 359/290
(58) Field of Classification Search ............... 359/290, 359/291, 223, 224, 238
See application file for complete search history.

(56) References Cited

U.S. PATENT DOCUMENTS

| | | |
|---|---|---|
| 3,982,239 A | 9/1976 | Sherr |
| 4,403,248 A | 9/1983 | te Velde |
| 4,441,791 A | 4/1984 | Hornbeck |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,681,403 A | 7/1987 | te Velde et al. |
| 4,709,995 A | 12/1987 | Kuribayashi et al. |
| 4,710,732 A | 12/1987 | Hornbeck |
| 4,856,863 A | 8/1989 | Sampsell et al. |

(Continued)

FOREIGN PATENT DOCUMENTS

EP 0295802 A 12/1988

(Continued)

OTHER PUBLICATIONS

International Preliminary Report on Patentability dated Apr. 5, 2007.

(Continued)

*Primary Examiner*—Timothy J Thompson
(74) *Attorney, Agent, or Firm*—Knobbe Martens Olson & Bear

(57) ABSTRACT

An iterferometric modulator is formed having a dielectric with charge persistence. The interferometric modulator is addressed by a method making advantageous use of the charge persistence property, wherein the interferometric modulator is pre-charged in such a way that the pre-charging is not observable to a viewer, and the actuation voltage threshold of the imod is significantly lowered. Subsequently the interferometric modulator may be actuated with a significantly lower actuation voltage, thereby saving power.

19 Claims, 11 Drawing Sheets

U.S. PATENT DOCUMENTS

| | | |
|---|---|---|
| 4,859,060 A | 8/1989 | Katagiri et al. |
| 4,954,789 A | 9/1990 | Sampsell |
| 4,956,619 A | 9/1990 | Hornbeck |
| 4,982,184 A | 1/1991 | Kirkwood |
| 5,018,256 A | 5/1991 | Hornbeck |
| 5,028,939 A | 7/1991 | Hornbeck et al. |
| 5,037,173 A | 8/1991 | Sampsell et al. |
| 5,055,833 A | 10/1991 | Hehlen et al. |
| 5,061,049 A | 10/1991 | Hornbeck |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,142,405 A | 8/1992 | Hornbeck |
| 5,142,414 A | 8/1992 | Koehler et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,227,900 A | 7/1993 | Inaba et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,287,215 A | 2/1994 | Warde et al. |
| 5,296,950 A | 3/1994 | Lin et al. |
| 5,305,640 A | 4/1994 | Boysel et al. |
| 5,312,513 A | 5/1994 | Florence et al. |
| 5,323,002 A | 6/1994 | Sampsell et al. |
| 5,325,116 A | 6/1994 | Sampsell |
| 5,327,286 A | 7/1994 | Sampsell et al. |
| 5,331,454 A | 7/1994 | Hornbeck |
| 5,339,116 A | 8/1994 | Urbanus et al. |
| 5,365,283 A | 11/1994 | Doherty et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,461,411 A | 10/1995 | Florence et al. |
| 5,488,505 A | 1/1996 | Engle |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,563,398 A | 10/1996 | Sampsell |
| 5,567,334 A | 10/1996 | Baker et al. |
| 5,570,135 A | 10/1996 | Gove et al. |
| 5,578,976 A | 11/1996 | Yao |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,598,565 A | 1/1997 | Reinhardt |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,612,713 A | 3/1997 | Bhuva et al. |
| 5,619,061 A | 4/1997 | Goldsmith et al. |
| 5,619,365 A | 4/1997 | Rhoads et al. |
| 5,619,366 A | 4/1997 | Rhoads et al. |
| 5,629,790 A | 5/1997 | Neukermans et al. |
| 5,633,652 A | 5/1997 | Kanbe et al. |
| 5,636,052 A | 6/1997 | Arney et al. |
| 5,638,084 A | 6/1997 | Kalt |
| 5,638,946 A | 6/1997 | Zavracky et al. |
| 5,646,768 A | 7/1997 | Kaeiyama |
| 5,650,834 A | 7/1997 | Nakagawa et al. |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,745,193 A | 4/1998 | Urbanus et al. |
| 5,745,281 A | 4/1998 | Yi et al. |
| 5,754,160 A | 5/1998 | Shimizu et al. |
| 5,771,116 A | 6/1998 | Miller et al. |
| 5,784,189 A | 7/1998 | Bozler et al. |
| 5,784,212 A | 7/1998 | Hornbeck |
| 5,808,780 A | 9/1998 | McDonald |
| 5,818,095 A | 10/1998 | Sampsell |
| 5,835,255 A | 11/1998 | Miles |
| 5,838,484 A | 11/1998 | Goosen |
| 5,842,088 A | 11/1998 | Thompson |
| 5,867,302 A | 2/1999 | Fleming et al. |
| 5,912,758 A | 6/1999 | Knipe et al. |
| 5,943,158 A | 8/1999 | Ford et al. |
| 5,959,763 A | 9/1999 | Bozler et al. |
| 5,966,235 A | 10/1999 | Walker et al. |
| 5,986,796 A | 11/1999 | Miles |
| 6,028,690 A | 2/2000 | Carter et al. |
| 6,038,056 A | 3/2000 | Florence et al. |
| 6,040,937 A | 3/2000 | Miles |
| 6,049,317 A | 4/2000 | Thompson et al. |
| 6,055,090 A | 4/2000 | Miles |
| 6,057,903 A | 5/2000 | Colgan et al. |
| 6,061,075 A | 5/2000 | Nelson et al. |
| 6,099,132 A | 8/2000 | Kaeriyama |
| 6,100,872 A | 8/2000 | Aratani et al. |
| 6,113,239 A | 9/2000 | Sampsell et al. |
| 6,147,790 A | 11/2000 | Meier et al. |
| 6,160,833 A | 12/2000 | Floyd et al. |
| 6,180,428 B1 | 1/2001 | Peeters et al. |
| 6,201,633 B1 | 3/2001 | Peeters et al. |
| 6,232,936 B1 | 5/2001 | Gove et al. |
| 6,246,398 B1 | 6/2001 | Koo |
| 6,275,326 B1 | 8/2001 | Bhalla et al. |
| 6,282,010 B1 | 8/2001 | Sulzbach et al. |

| | | | | | |
|---|---|---|---|---|---|
| 6,295,154 B1 | 9/2001 | Laor et al. | 2001/0046081 A1 | 11/2001 | Hayashi et al. |
| 6,304,297 B1 | 10/2001 | Swan | 2001/0051014 A1 | 12/2001 | Behin et al. |
| 6,323,982 B1 | 11/2001 | Hornbeck | 2002/0000959 A1 | 1/2002 | Colgan et al. |
| 6,327,071 B1 | 12/2001 | Kimura | 2002/0005827 A1 | 1/2002 | Kobayashi |
| 6,356,085 B1 | 3/2002 | Ryat et al. | 2002/0010763 A1 | 1/2002 | Salo et al. |
| 6,356,254 B1 | 3/2002 | Kimura | 2002/0012159 A1 | 1/2002 | Tew |
| 6,381,022 B1 | 4/2002 | Zavracky | 2002/0015215 A1 | 2/2002 | Miles |
| 6,429,601 B1 | 8/2002 | Friend et al. | 2002/0024711 A1 | 2/2002 | Miles |
| 6,433,917 B1 | 8/2002 | Mei et al. | 2002/0036304 A1 | 3/2002 | Ehmke et al. |
| 6,447,126 B1 | 9/2002 | Hornbeck | 2002/0050882 A1 | 5/2002 | Hyman et al. |
| 6,465,355 B1 | 10/2002 | Horsley | 2002/0054424 A1 | 5/2002 | Miles et al. |
| 6,466,358 B2 | 10/2002 | Tew | 2002/0075226 A1 | 6/2002 | Lippincott |
| 6,473,274 B1 | 10/2002 | Maimone et al. | 2002/0075555 A1 | 6/2002 | Miles |
| 6,480,177 B2 | 11/2002 | Doherty et al. | 2002/0093722 A1 | 7/2002 | Chan et al. |
| 6,483,456 B2 | 11/2002 | Huisken | 2002/0097133 A1 | 7/2002 | Charvet et al. |
| 6,496,122 B2 | 12/2002 | Sampsell | 2002/0126354 A1 | 9/2002 | Jeong et al. |
| 6,501,107 B1 | 12/2002 | Sinclair et al. | 2002/0126364 A1 | 9/2002 | Miles |
| 6,507,330 B1 | 1/2003 | Handschy et al. | 2002/0179421 A1 | 12/2002 | Williams et al. |
| 6,507,331 B1 | 1/2003 | Schlangen et al. | 2002/0186108 A1 | 12/2002 | Hallbjorner |
| 6,545,335 B1 | 4/2003 | Chua et al. | 2003/0004272 A1 | 1/2003 | Power |
| 6,548,908 B2 | 4/2003 | Chua et al. | 2003/0043157 A1 | 3/2003 | Miles |
| 6,549,338 B1 | 4/2003 | Wolverton et al. | 2003/0072070 A1 | 4/2003 | Miles |
| 6,552,840 B2 | 4/2003 | Knipe | 2003/0122773 A1 | 7/2003 | Washio et al. |
| 6,574,033 B1 | 6/2003 | Chui et al. | 2003/0137215 A1 | 7/2003 | Cabuz |
| 6,589,625 B1 | 7/2003 | Kothari et al. | 2003/0137521 A1 | 7/2003 | Zehner et al. |
| 6,593,934 B1 | 7/2003 | Liaw et al. | 2003/0189536 A1 | 10/2003 | Ruigt |
| 6,600,201 B2 | 7/2003 | Hartwell et al. | 2003/0202264 A1 | 10/2003 | Weber et al. |
| 6,606,175 B1 | 8/2003 | Sampsell et al. | 2003/0202265 A1 | 10/2003 | Reboa et al. |
| 6,625,047 B2 | 9/2003 | Coleman, Jr. | 2003/0202266 A1 | 10/2003 | Ring et al. |
| 6,630,786 B2 | 10/2003 | Cummings et al. | 2004/0008396 A1 | 1/2004 | Stappaerts |
| 6,632,698 B2 | 10/2003 | Ives | 2004/0022044 A1 | 2/2004 | Yasuoka et al. |
| 6,633,306 B1 | 10/2003 | März et al. | 2004/0027701 A1 | 2/2004 | Ishikawa |
| 6,643,069 B2 | 11/2003 | Dewald | 2004/0051929 A1 | 3/2004 | Sampsell et al. |
| 6,650,455 B2 | 11/2003 | Miles | 2004/0058532 A1 | 3/2004 | Miles et al. |
| 6,657,832 B2 | 12/2003 | Williams et al. | 2004/0080807 A1 | 4/2004 | Chen et al. |
| 6,666,561 B1 | 12/2003 | Blakley | 2004/0145049 A1 | 7/2004 | McKinnell et al. |
| 6,674,090 B1 | 1/2004 | Chua et al. | 2004/0147056 A1 | 7/2004 | McKinnell et al. |
| 6,674,562 B1 | 1/2004 | Miles | 2004/0160143 A1 | 8/2004 | Shreeve et al. |
| 6,680,792 B2 | 1/2004 | Miles | 2004/0174583 A1 | 9/2004 | Chen et al. |
| 6,710,908 B2 | 3/2004 | Miles et al. | 2004/0179281 A1 | 9/2004 | Reboa |
| 6,741,377 B2 | 5/2004 | Miles | 2004/0212026 A1 | 10/2004 | Van Brocklin et al. |
| 6,741,384 B1 | 5/2004 | Martin et al. | 2004/0217378 A1 | 11/2004 | Martin et al. |
| 6,741,503 B1 | 5/2004 | Farris et al. | 2004/0217919 A1 | 11/2004 | Pichl et al. |
| 6,747,785 B2 | 6/2004 | Chen et al. | 2004/0218251 A1 | 11/2004 | Piehl et al. |
| 6,762,873 B1 | 7/2004 | Coker et al. | 2004/0218334 A1 | 11/2004 | Martin et al. |
| 6,775,174 B2 | 8/2004 | Huffman et al. | 2004/0218341 A1 | 11/2004 | Martin et al. |
| 6,778,155 B2 | 8/2004 | Doherty et al. | 2004/0223204 A1 | 11/2004 | Mao et al. |
| 6,781,643 B1 | 8/2004 | Watanabe et al. | 2004/0227493 A1 | 11/2004 | Van Brocklin et al. |
| 6,787,384 B2 | 9/2004 | Okumura | 2004/0240032 A1 | 12/2004 | Miles |
| 6,787,438 B1 * | 9/2004 | Nelson ............ 438/584 | 2004/0240138 A1 | 12/2004 | Martin et al. |
| 6,788,520 B1 | 9/2004 | Behin et al. | 2004/0245588 A1 | 12/2004 | Nikkel et al. |
| 6,794,119 B2 | 9/2004 | Miles | 2004/0263944 A1 | 12/2004 | Miles et al. |
| 6,811,267 B1 | 11/2004 | Allen et al. | 2005/0001828 A1 | 1/2005 | Martin et al. |
| 6,813,060 B1 | 11/2004 | Garcia et al. | 2005/0012577 A1 * | 1/2005 | Pillans et al. ............ 335/78 |
| 6,819,469 B1 | 11/2004 | Koba | 2005/0038950 A1 | 2/2005 | Adelmann |
| 6,822,628 B2 | 11/2004 | Dunphy et al. | 2005/0057442 A1 | 3/2005 | Way |
| 6,829,132 B2 | 12/2004 | Martin et al. | 2005/0068583 A1 | 3/2005 | Gutkowski et al. |
| 6,853,129 B1 | 2/2005 | Cummings et al. | 2005/0069209 A1 | 3/2005 | Damera-Venkata et al. |
| 6,855,610 B2 | 2/2005 | Tung et al. | 2005/0116924 A1 | 6/2005 | Sauvante et al. |
| 6,859,218 B1 | 2/2005 | Luman et al. | 2005/0206991 A1 | 9/2005 | Chui et al. |
| 6,861,277 B1 | 3/2005 | Monroe et al. | 2005/0286113 A1 | 12/2005 | Miles |
| 6,862,022 B2 | 3/2005 | Slupe | 2005/0286114 A1 | 12/2005 | Miles |
| 6,862,029 B1 | 3/2005 | D'Souza et al. | 2006/0044246 A1 | 3/2006 | Mignard |
| 6,867,896 B2 | 3/2005 | Miles | 2006/0044298 A1 | 3/2006 | Mignard et al. |
| 6,870,581 B2 | 3/2005 | Li et al. | 2006/0044928 A1 | 3/2006 | Chui et al. |
| 6,903,860 B2 | 6/2005 | Ishii | 2006/0056000 A1 | 3/2006 | Mignard |
| 6,940,631 B2 * | 9/2005 | Ishikawa ............ 359/291 | 2006/0057754 A1 | 3/2006 | Cummings |
| 7,110,158 B2 * | 9/2006 | Miles ............ 359/291 | 2006/0066542 A1 | 3/2006 | Chui |
| 7,123,216 B1 | 10/2006 | Miles | 2006/0066559 A1 | 3/2006 | Chui et al. |
| 7,136,213 B2 | 11/2006 | Chui | 2006/0066560 A1 | 3/2006 | Gally et al. |
| 7,161,728 B2 | 1/2007 | Sampsell et al. | 2006/0066561 A1 | 3/2006 | Chui et al. |
| 7,457,019 B2 * | 11/2008 | Nanjyo et al. ............ 359/199 | 2006/0066594 A1 | 3/2006 | Tyger |
| 2001/0034075 A1 | 10/2001 | Onoya | 2006/0066597 A1 | 3/2006 | Sampsell |

| | | | |
|---|---|---|---|
| 2006/0066598 A1 | 3/2006 | Floyd | |
| 2006/0066601 A1 | 3/2006 | Kothari | |
| 2006/0066937 A1 | 3/2006 | Chui | |
| 2006/0066938 A1 | 3/2006 | Chui | |
| 2006/0067648 A1 | 3/2006 | Chui et al. | |
| 2006/0067653 A1 | 3/2006 | Gally et al. | |
| 2006/0077127 A1 | 4/2006 | Sampsell et al. | |
| 2006/0077505 A1 | 4/2006 | Chui et al. | |
| 2006/0077520 A1 | 4/2006 | Chui et al. | |
| 2006/0103613 A1 | 5/2006 | Chui | |
| 2006/0250335 A1 | 11/2006 | Stewart et al. | |
| 2006/0250350 A1 | 11/2006 | Kothari et al. | |
| 2006/0279495 A1 | 12/2006 | Moe et al. | |

FOREIGN PATENT DOCUMENTS

| | | |
|---|---|---|
| EP | 0300754 A2 | 1/1989 |
| EP | 0306308 A2 | 3/1989 |
| EP | 0318050 A | 5/1989 |
| EP | 0417523 A | 3/1991 |
| EP | 0467048 A | 1/1992 |
| EP | 0570906 A | 11/1993 |
| EP | 0608056 A1 | 7/1994 |
| EP | 0655725 A1 | 5/1995 |
| EP | 0667548 A1 | 8/1995 |
| EP | 0725380 A1 | 8/1996 |
| EP | 0852371 A1 | 7/1998 |
| EP | 0911794 A1 | 4/1999 |
| EP | 1017038 A | 7/2000 |
| EP | 1039311 A1 | 9/2000 |
| EP | 1146533 A | 10/2001 |
| EP | 02062493 | 2/2002 |
| EP | 1258860 A1 | 11/2002 |
| EP | 1343190 A | 9/2003 |
| EP | 1345197 A | 9/2003 |
| EP | 1381023 A | 1/2004 |
| EP | 1473691 A2 | 11/2004 |
| GB | 2401200 A | 11/2004 |
| JP | 2002-175053 | 6/2002 |
| JP | 2004-29571 | 1/2004 |
| JP | 2004004553 | 8/2004 |
| WO | WO 95/30924 | 11/1995 |
| WO | WO 97/17628 | 5/1997 |
| WO | WO 99/52006 A3 | 10/1999 |
| WO | WO 01/08441 A1 | 2/2001 |
| WO | WO 01/73937 A | 10/2001 |
| WO | WO 03/007049 A1 | 1/2003 |
| WO | WO 03/015071 A2 | 2/2003 |
| WO | WO 03/044765 A2 | 5/2003 |
| WO | WO 03/060940 A | 7/2003 |
| WO | WO 03/069413 A1 | 8/2003 |
| WO | WO 03/073151 A1 | 9/2003 |
| WO | WO 03/079323 A | 9/2003 |
| WO | WO 03/090199 A1 | 10/2003 |
| WO | WO 2004/006003 A1 | 1/2004 |
| WO | WO 2004/026757 A2 | 4/2004 |
| WO | WO 2004/049034 A1 | 6/2004 |

OTHER PUBLICATIONS

Miles et al., 5.3: Digital PaperTM: Reflective displays using interferometric modulation, SID Digest, vol. XXXI, 2000 pp. 32-35.

Office Action dated Feb. 28, 2006 in U.S. Appl. No. 11/205,268.

ISR and WO for PCT/US05/032121 filed Sep. 9, 2005.

IPRP for PCT/US05/032121, filed Sep. 9, 2005.

Bains, Digital paper display technology holds promise for portables, CommsDesign EE Times (2000).

Lieberman, MEMS display looks to give PDAs sharper image, EE Times (2004).

Lieberman, Microbridges at heart of new MEMS displays, EE Times (2004).

Miles, Interferometric modulation: MOEMS as an enabling technology for high-performance reflective displays, Proceedings of SPIE, vol. 4985, pp. 131-139 (2003).

Miles, MEMS-based interferometric modulator for display applications, Part of the SPIE Conference on Micromachined Devices and Components, vol. 3876, pp. 20-28 (1999).

Miles et al., 10.1: Digital Paper™ for reflective displays, SID 02 Digest, pp. 115-117 (2002).

Peroulis et al., Low contact resistance series MEMS switches, 2002, pp. 223-226, vol. 1, IEEE MIT-S International Microwave Symposium Digest, New York, NY.

Seeger et al., Stabilization of electrostatically actuated mechanical devices, (1997) International Conference on Solid State Sensors and Actuators; vol. 2, pp. 1133-1136.

Official Communication dated Jun. 18, 2009 in European App. No. 05795249.1.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

US 7,667,884 B2

INTERFEROMETRIC MODULATORS HAVING CHARGE PERSISTENCE

CROSS REFERENCE TO RELATED APPLICATIONS

This application is a continuation application of U.S. application Ser. No. 11/205,268, titled "Interferometric Modulators Having Charge Persistence," filed Aug. 15, 2005, now U.S. Pat. No. 7,136,213, which claims priority to U.S. Provisional Application No. 60/613,420, titled "Interferometric Modulators Having Charge Persistence," filed Sep. 27, 2004, the specifications of which are hereby incorporated by reference, in their entirety.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Some displays can be made from elements which are addressed with the unique scheme discussed below. When the display elements have a substantial charge persistence characteristic the elements may be pre-charged in a write operation, displayed with a voltage lower than would otherwise be needed in a display operation, and finally cleared in a clear operation in preparation for a subsequent write operation. The scheme is particularly useful for lower power operation.

Figure 1:
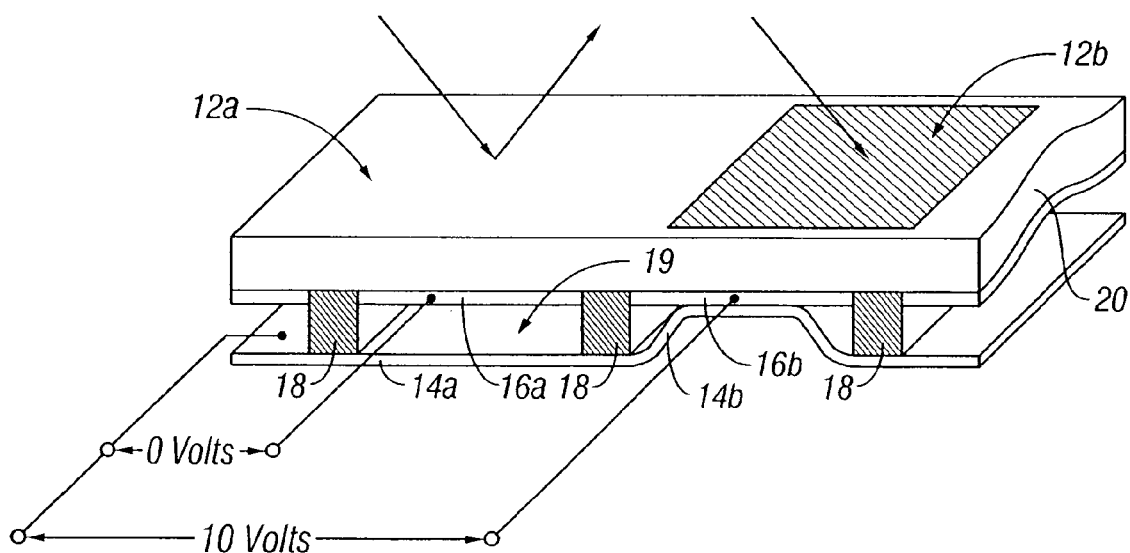
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
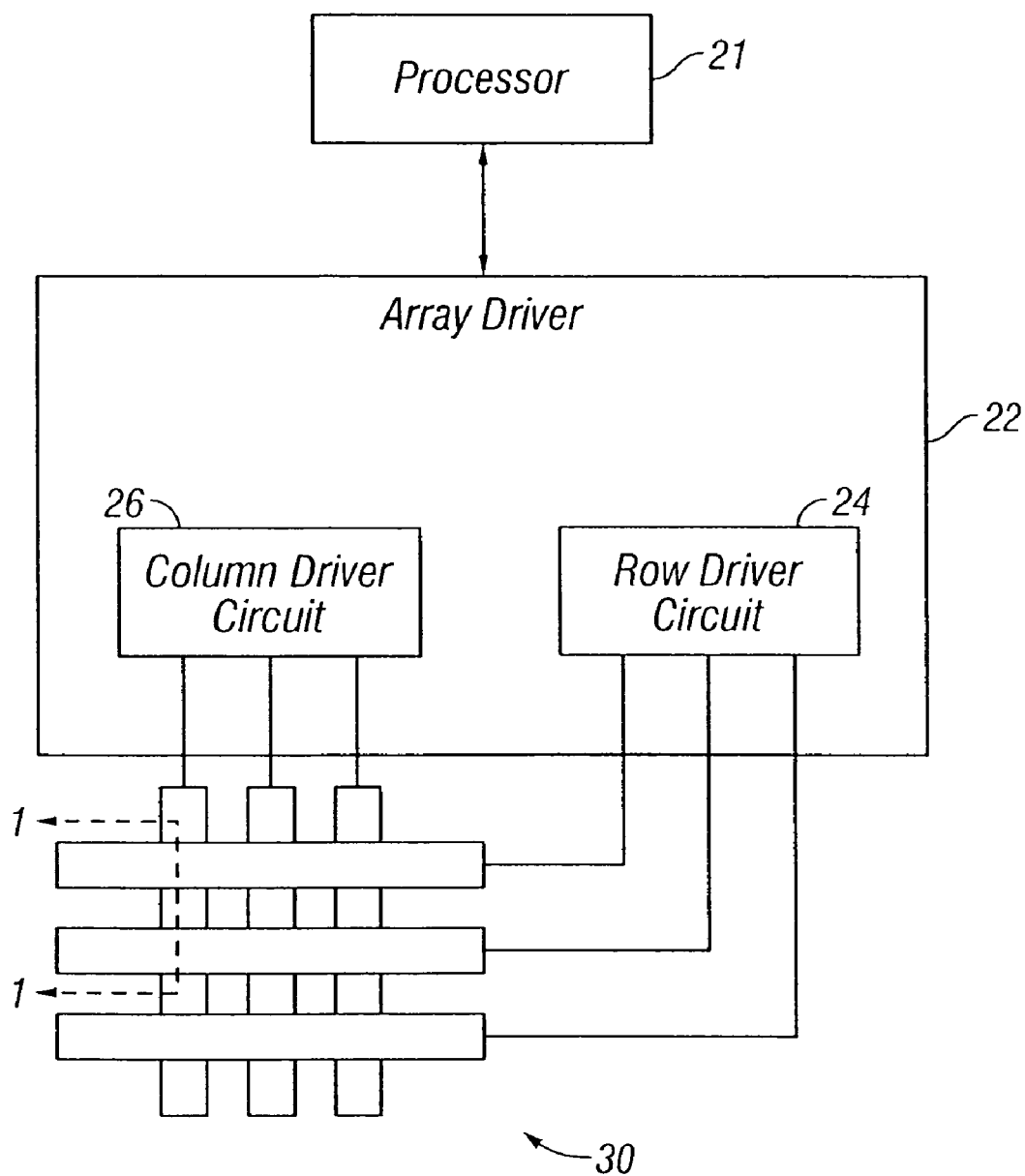
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window."

Figures 3, 4:
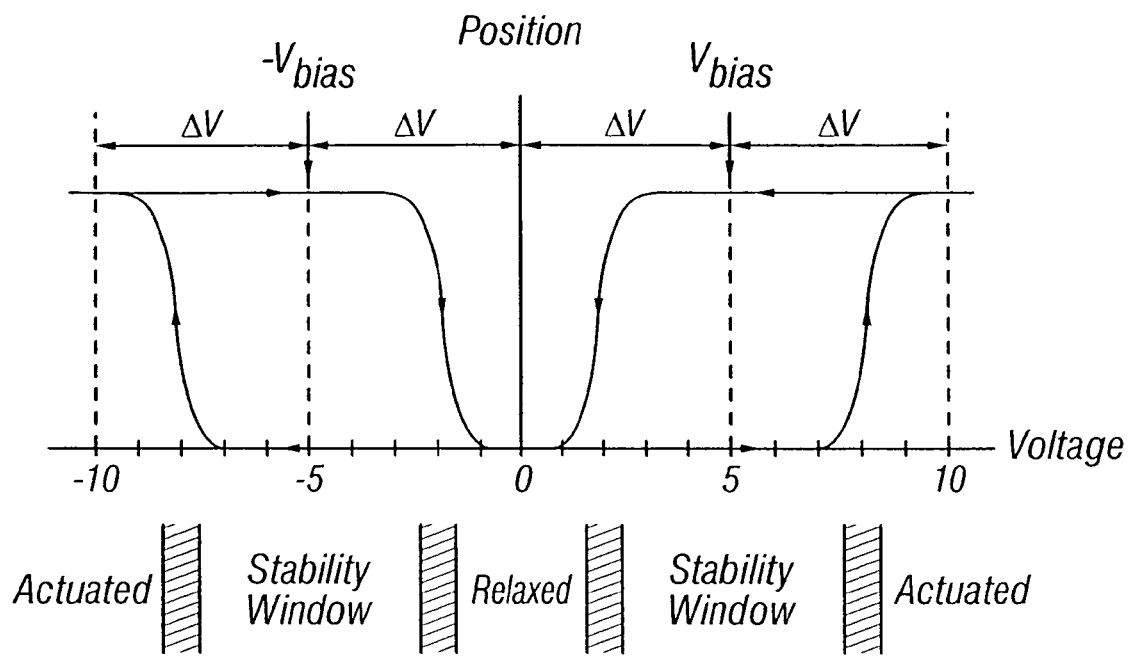
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
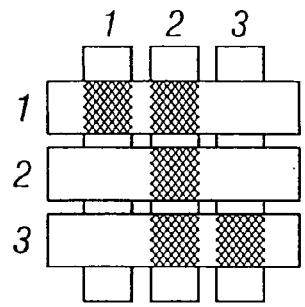
FIGS. 5A and 5B illustrate one exemplary timing diagram for row and column signals that may be used to write a frame of display data to the 3×3 interferometric modulator display of FIG. 2.
Figure 5B:
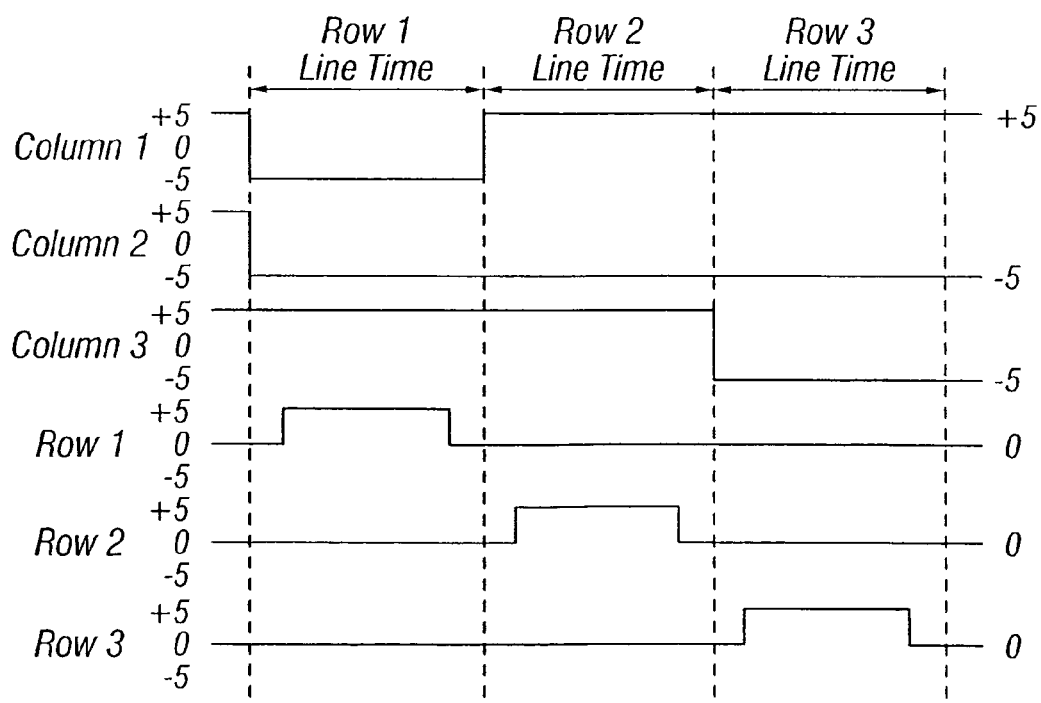

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
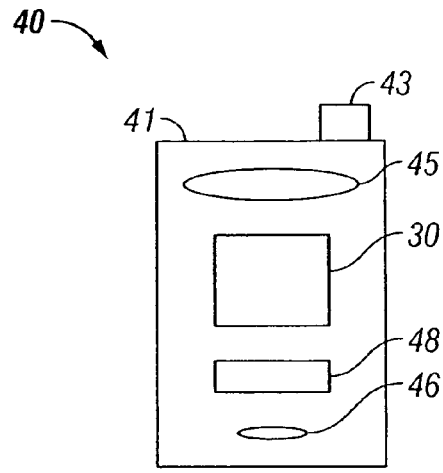
FIGS. 6A and 6B are system block diagrams illustrating an embodiment of a visual display device comprising a plurality of interferometric modulators.
Figure 6B:
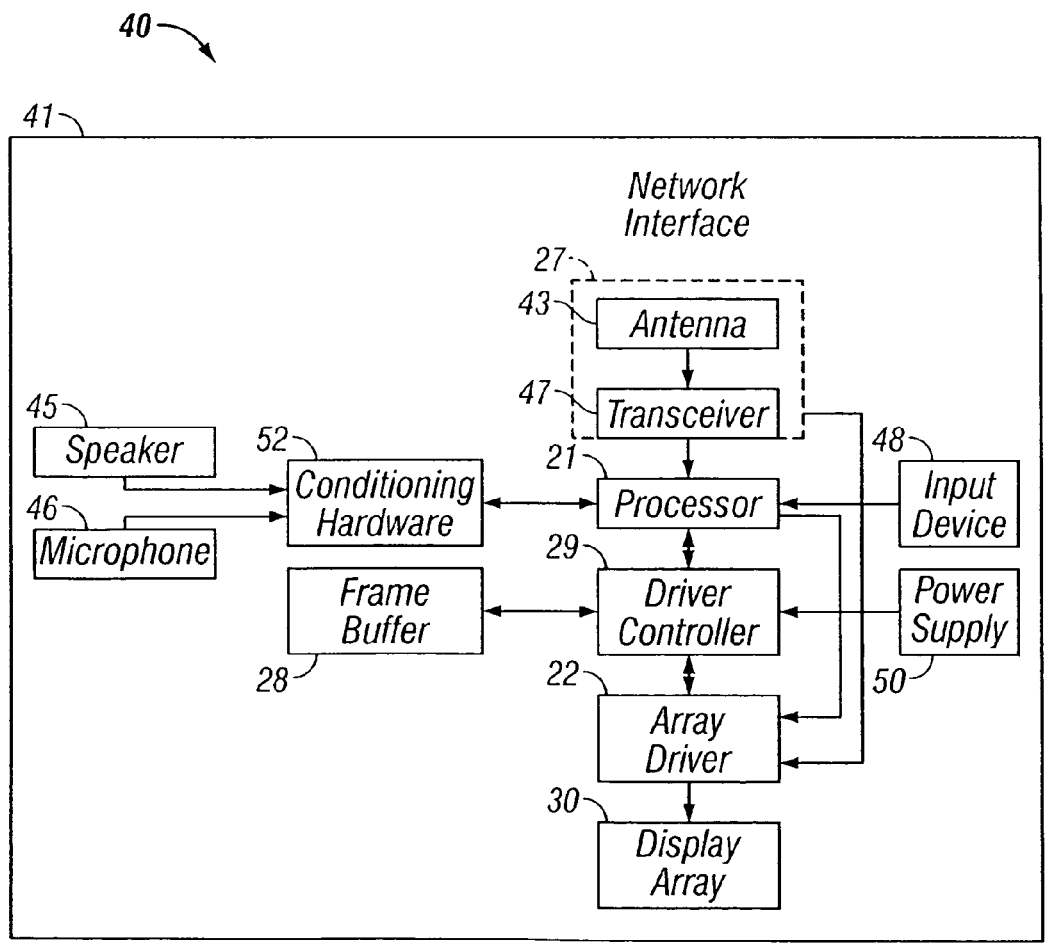

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUE-TOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
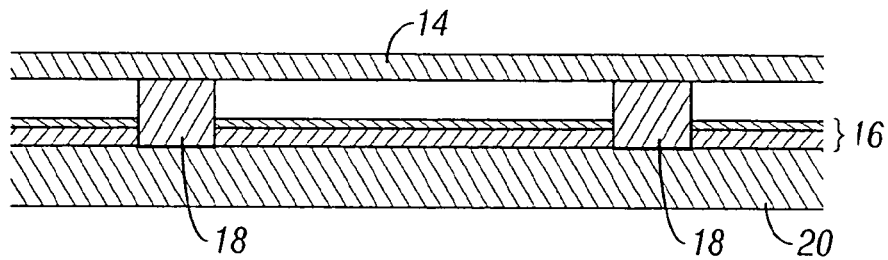
FIG. 7A is a cross section of the device of FIG. 1.
Figure 7B:
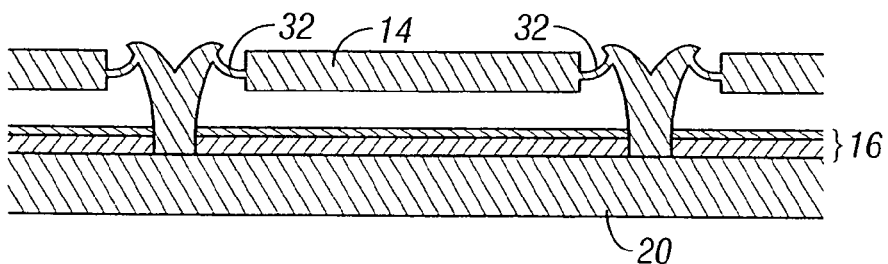
FIG. 7B is a cross section of an alternative embodiment of an interferometric modulator.
Figure 7C:
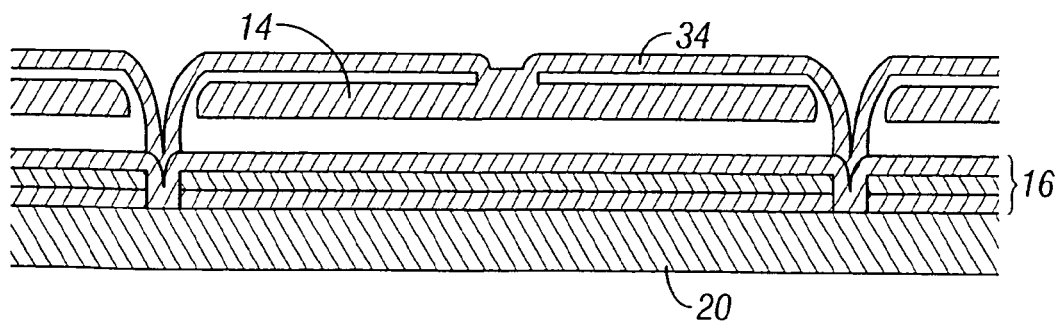
FIG. 7C is a cross section of another alternative embodiment of an interferometric modulator.
Figure 7D:
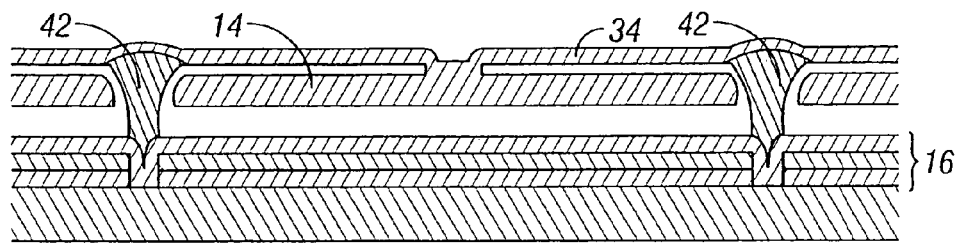
FIG. 7D is a cross section of yet another alternative embodiment of an interferometric modulator.
Figure 7E:
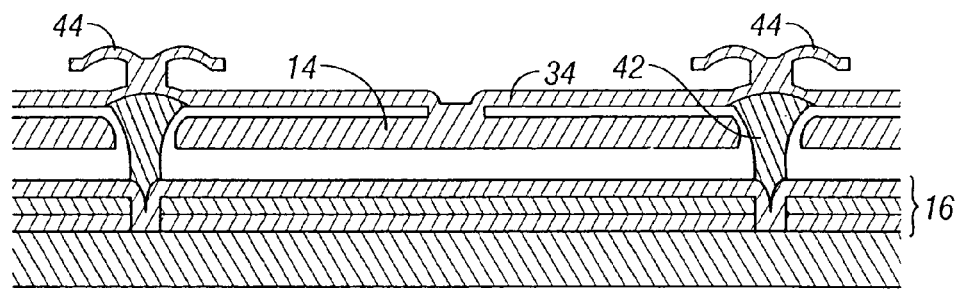
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8A:
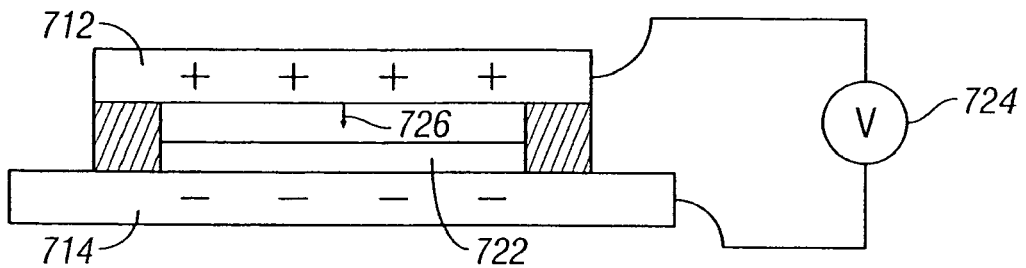
FIGS. 8A, 8B, and 8C are schematic side views of an interferometric modulator illustrating the process of embedding a charge in the dielectric layer of the interferometric modulator.
Figure 8B:
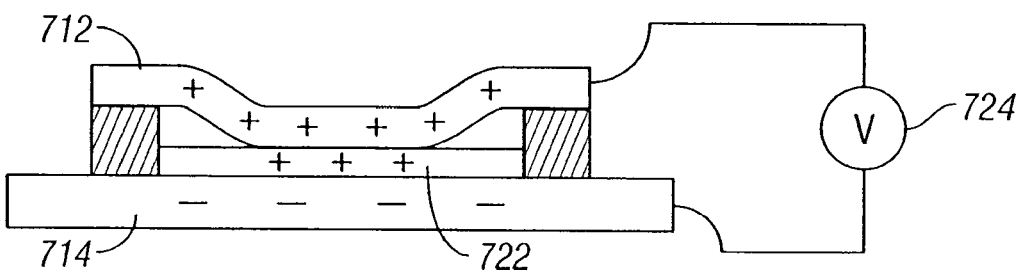
Figure 8C:
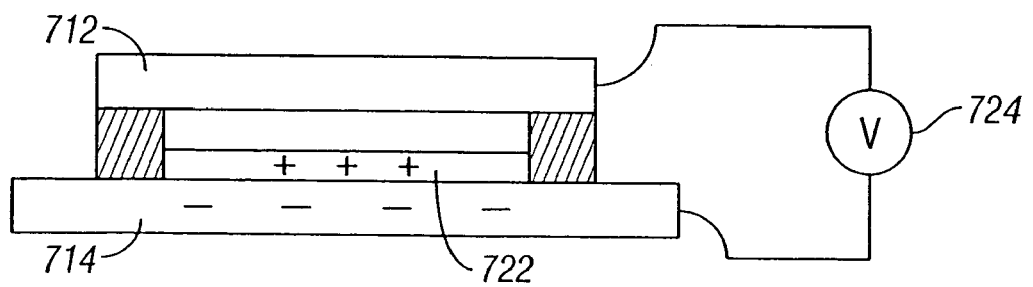

FIGS. 8A, 8B, and 8C show a side cross-sectional view of an interferometric modulator with structure similar to the device shown in FIG. 7A. These figures illustrate the application of a voltage from the voltage source 724 across the reflective layer 712 and the optical stack 714. In FIG. 8B, the reflective layer 712 is illustrated in its deformed state, where it is drawn closer to the optical stack 722 by an electrostatic force produced by the applied voltage. As shown in FIG. 8B, as reflective layer 712 contacts or becomes sufficiently close to the dielectric stack 722, it transfers electrical charge to the dielectric stack 722. FIG. 8C shows the device when the electrical potential induced by the voltage source 724 is removed or reduced such that the reflective layer 712 returns to its non-deformed state. However, it is also seen that the dielectric stack 722 still holds some or all of the electrical charge that was transferred to it when the reflective layer 712 was deformed and brought into contact or near contact with the dielectric stack. As shown in FIG. 8C, the transferred charge is a positive charge or "potential." This potential will typically persist in the dielectric stack for greater than at least 100 ms or until an opposite potential is applied between the reflective layer 712 and the optical stack 722. This occurs when the reflective layer 712 deforms into the cavity 718 and delivers a negative potential to the dielectric stack 722.

The property by which the dielectric stack holds the potential can be referred to as "charge persistence." When a dielectric stack is holding a potential, that potential may be referred to as an "embedded potential" or an "embedded charge." The description herein of an embedded potential that happens to be positive is not intended to suggest that embodiments using opposite polarity are disfavored. Indeed, in some embodiments opposite polarities are used. In some embodiments both polarities may be used.

In some embodiments interferometric modulators are manufactured with dielectric, such as silicon nitride, silicon dioxide, aluminum oxide, and/or titanium dioxide, which can be made to be more capable of accepting charge using techniques known by those skilled in the art. Such a dielectric is known as being trappy. While this property is often undesirable and therefore avoided, for some embodiments discussed herein dielectrics with at least trappy surfaces are desirable.

In some embodiments, interferometric modulators such as those described above are arranged in an array to create one or more pixels in a video display module. In some embodiments, a video display circuit is configured to receive and carry out instructions from a computer processor or other instruction source so that an output can be expressed on the video display circuit. The instructions for the video display circuit may include image data indicating which interferometric modulators should be selected for actuation in each frame. In some embodiments, the process of embedding a potential is performed for the purpose of priming the selected interferometric modulators in an array to participate in displaying a video output. Accordingly, the various interferometric modulators of an array can be primed with one or more voltages or not primed at all, based on the output desired. The selection of particular interferometric modulators or pixels in an array can thus enable representation of text, images, or other indicia to be displayed on the video display as an output.

When interferometric modulators that are equipped with dielectric stacks capable of holding an embedded charge are used, the instructions for the video display output can cause circuitry to drive selected interferometric modulators to actuate and then be released, so that the dielectric stacks of the selected interferometric modulators are left with an embedded charge. At the same time, other interferometric modulators of the array will not be selected to receive an embedded charge. The arrangement of selected and non-selected interferometric modulators corresponds to the desired output on the video display module. Although the selected interferometric modulators holding the embedded charge exhibit the arrangement according to the video display instructions, an image may not actually be shown on the video display output since the interferometric properties that are visible to a user or a light detecting module of each interferometric modulator would not necessarily differ between those holding an embedded charge and those not holding one. This condition occurs because the reflective layers 712 would all be back in the same non-deformed configuration. The process of embedding charges in selected interferometric modulators may be referred to as a "writing" stage.

Figure 9A:
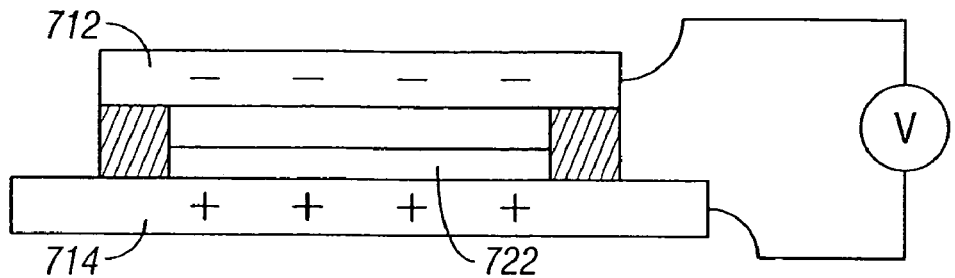
FIGS. 9A, 9B, and 9C are schematic side views of an interferometric modulator illustrating the process of applying an opposite polarity, global DC bias after a charge has been embedded in selected interferometric modulators.
Figure 9B:
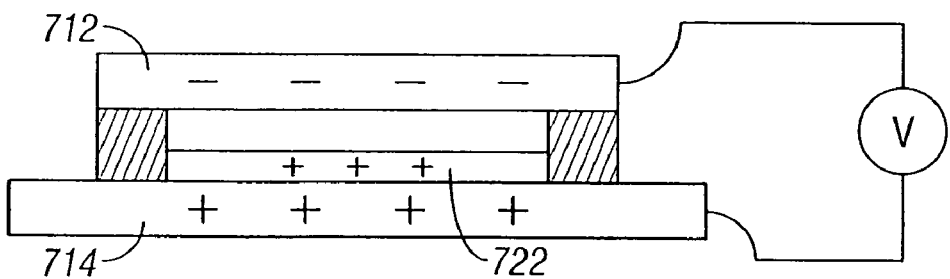
Figure 9C:
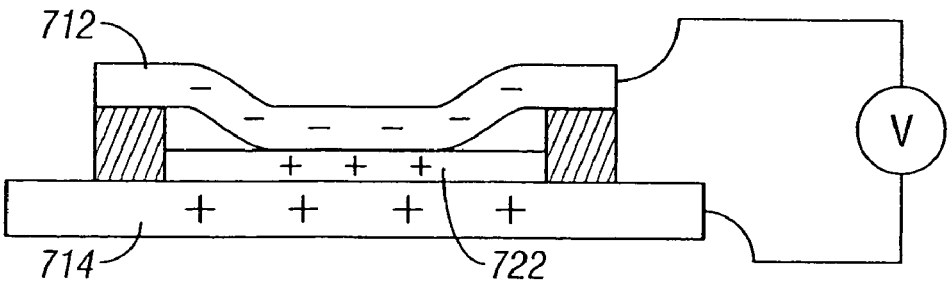

In some embodiments, the writing stage is following by a "displaying" stage in which a circuit applies a voltage so as to actuate the selected interferometric modulators and induce one or more interferometric events to create an output that can be perceived by a user or a light detecting module. The voltage applied during the displaying stage may be opposite in polarity to that of the writing stage and will be applied globally to all of the interferometric modulators of the array. FIGS. 9A, 9B, and 9C show a process of applying an opposite polarity DC bias. In FIG. 9A, the interferometric modulator depicted is one that was not selected during the writing stage to receive an embedded charge in the dielectric stack 722. As shown in FIG. 9A, the applied electrical potential is not great enough to induce an electrostatic force capable of deforming the reflective layer 712. In FIG. 9B, however, an interferometric modulator is depicted that was selected during the writing stage. Accordingly, the dielectric stack 722 of the interferometric modulator shown in FIG. 9B contains an embedded charge. In FIG. 9B, when the opposite polarity DC bias is applied between the reflective layer 722 and the optical stack 714, the added potential of the dielectric stack 722 makes the combined potential greater. The greater combined potential in turn generates a greater electrostatic force than that which is present in the device without embedded charge, as shown in FIG. 9A. This combined electrostatic force in the device, as shown in FIG. 9B is strong enough to cause the reflective layer 722 to deform, as shown in FIG. 9C. The deformation in turn alters the interferometric properties of the cavity such that those interferometric modulators which were selected are visibly different than those which were not selected to the user or light detecting module. This creates a perceivable contrast between actuated interferometric modulators and non-actuated interferometric modulators in the array.

Finally, the display can be reset in a "clearing" stage. In some embodiments, this is done by applying another voltage to the dielectric stack. In some embodiments, the clearing step is performed as a global action, meaning that it is applied over the entire array simultaneously. Advantageously, the process is short enough in time that the viewer does not perceive it. In some embodiments, the clearing stage lasts less than 10 milliseconds. Types of clearing signals can include: a short, large amplitude negative potential pulse; a short, large amplitude positive potential pulse followed by a short, large amplitude negative pulse; and/or a short AC waveform toggling between a large positive and negative potential. Use of such an AC waveform can be referred to as an AC "wash". The type of waveform used to clear out the charge "memory" depends in part on the specific characteristics of the dielectric stack.

Example: Operating a Plurality of Interferometric Modulators in an Array

In some embodiments, interferometric modulators can be assembled as an array. In some embodiments, one or more interferometric modulators so arranged act as a pixel. In turn, an array of pixels can operate as a video display module. An output on the video display can be created using the following process.

The example below contemplates an array of interferometric modulators which all have an actuation threshold of 5 V. With a 5 V actuation threshold a voltage difference in excess of +5 V or −5 V between the upper and optical stacks will cause the reflective layer 722 to deform.

Instructions to generate an output on a video display module are sent to an array of interferometric modulators in the form of high and low voltages. The interferometric modulators are arranged in rows and columns. A high voltage (+10 V) is applied to the electrodes of the reflective layers of all the interferometric modulators in a single row. While that voltage is held constant, an electrical interface to each column sends a data voltage to each of the electrodes in the optical stacks of the interferometric modulators in that row. If a particular interferometric modulator is intended to actuate, the data voltage is sent as a low voltage (0 V) so that the net difference, +10 V, causes the interferometric modulator to actuate. The application of this voltage lasts just long enough for a portion of the reflective layer to come into contact with the dielectric stack. Typically, this is shorter than the time that would be required for the reflective layer to settle into a stable "down" position, and is typically shorter than would be necessary to be perceived by a viewer. When the reflective layer is in this deformed position, it transfers some charge to the dielectric stack, resulting in an embedded charge causing a shift in the actuation threshold of that device. The magnitude of the threshold shift corresponds to the quantity of embedded charge. When the magnitude of the shift is sufficient that those interferometric modulators with the shifted actuation thresholds can be readily differentiated from those which do not have shifted thresholds during the display stage discussed below, we call the shift "significant."

If an interferometric modulator is one that should not actuate, the data voltage is sent as a high voltage (+10 V) so that the net difference, 0 V is not enough to induce the interferometric modulator to actuate. Because the interferometric modulator does not actuate, no charge is transferred or embedded in the dielectric stack of that interferometric modulator, and its actuation threshold remains unchanged. When this process is complete, all of the selected interferometric modulators in that row have embedded potentials within their dielectric stacks and correspondingly significantly lower actuation thresholds, and all of the non-selected interferometric modulators in that row do not have such embedded potentials within their dielectric stacks and therefore have correspondingly unchanged actuation thresholds.

From this condition, the voltages applied to the rows and columns are all released so that all of the reflective layers return to their non-deformed state. The next row of interferometric modulators is then likewise written, and so on. When all of the rows have been written, the arrangement of embedded voltages corresponds spatially to the desired output, which may be in the form of text and images on the video display module. However, at this point the output is not visible to a user or to a light detecting module positioned to perceive the output. This is because the interferometric properties of all of the interferometric modulators are the same since none of the reflective layers is in a deformed position.

Those of skill in the art will appreciate that screens of different shapes and sizes will have different time requirements for the writing stage because of the number and orientation of interferometric modulators in the arrays. In general, the time required to complete the writing stage can be calculated by multiplying the number of rows by the addressing line time. This product should be less than the time required for the human eye to perceive a change. For example, a typical line time is approximately 5 microseconds. A display containing up to 1000 lines could be written in 5 milliseconds, which is typically fast enough that the human eye will not perceive the writing process.

As the display elements have been primed, the next step is to display the image. This is done by applying a global, DC bias to all of the interferometric modulators in the array. The global bias applied is greater than the significantly reduced actuation threshold of the interferometric modulators selected based on the image data, but less than the unaltered actuation threshold of the interferometric modulators not selected. Therefore, the selected interferometric modulators actuate and the unselected interferometric modulators do not. The global bias is held long enough for a user or a light detecting module to perceive the output. The difference in reflectivity between the actuated and unactuated interferometric modulators is sufficient and the image is perceived.

In order to achieve acceptable performance, a useful guideline in preparing instructions for an array is that a single cycle of display time should last about 10 times longer than the scan time (the time used for operations other than displaying). In some embodiments, however, the display time can be much longer, depending on the requirements of the application and type of dielectric materials used in the dielectric stack. It has been discovered that useful display times for a single output cycle can range from about 10 milliseconds to as long as several seconds.

It has been observed that an image will start to fade if the display time is too long. Although the time to perceived fading varies depending on the specific dielectric stack that is used, the image begins to fade when the display time exceeds the characteristic charge diffusion time, which is the time it takes charge to move in or out of the dielectric stack in response to an applied electric field. Fading occurs because the potential from the reflective layer transfers to the dielectric stack. This offsets the embedded charge so that the actuation threshold rises, and the applied bias is no longer sufficient to hold the reflective layer in a deformed state.

To reset the output, the array is then cleared of all data. This is accomplished by applying one or more global clearing voltages to all of the interferometric modulators in the array. Once the array is cleared, it is effectively a blank slate on which to write a new output by repeating the process described above. Refreshing the output is advantageous not only to renew the vividness of a display that is fading, but also in applications where text or data is updated, or in applications where a series of slightly different images are used to create an illusion of motion.

There are several advantages to this type of process for certain types of applications. For example, when using a charge persistence technique, less power is required to actuate selected interferometric modulators in an array to create a video output than in a prior art process of applying and holding a potential within a hysteresis window to induce deformation of the reflective layer. Less power is required because the voltage needed to actuate a selected interferometric modulator and hold its reflective layer in a deformed position is lower. For example, if the voltage required to actuate and hold an interferometric modulator is 5V, then the constant voltage required would be at least 5V for the duration of the output cycle. However, when using the charge persistence technique, a holding voltage that is lower, such as 3V or 2V or less may be sufficient. Power savings are attained despite the use of a greater voltage during the writing stage and clearing stages. This occurs because the application of voltage during the writing and clearing stages is of such a short duration relative to the displaying stage.

Additionally, because the addressing need not rely on the presence of any meaningful electromechanical hysteresis, and may rely only on the charging characteristics of the dielectric, it is possible to design very low voltage displays. This is so because only the actuation voltage, and not the release voltage is of concern. Additionally, manufacturing processes can be made less stringent, since some embodiments only require distinction between voltage levels at which the interferometric modulator is clearly on or clearly off. This differs from some display technologies that rely on a hysteresis window, wherein the primary concern is having a clear separation between the actuation and release thresholds. In some hysteresis designs, maintaining a sufficiently wide window between the two voltages means that control of device uniformity over a large substrate is very important. Such uniformity is much less important in some embodiments using a charge persistence design, which can make the devices less expensive to manufacture. The low voltage, "sloppy" nature of some charge persistence designs can also have power consumption implications when operating in video mode. For example, the power required to operate a device of this type can be determined as follows:

$$\text{Power} \sim \tfrac{1}{2} C_{col} \times V_{swing}^2 \times f$$

In this equation, $C_{col}$ is the capacitance along the columns, $V_{swing}$ is the amplitude of the voltage switching along the columns, and f is the frequency with which the swings occur. For a display using charge persistence operating at a comparable refresh rate to used for a hysteresis addressed display, the power consumed by the charge persistence array will be lower because the capacitance on the columns and the $V_{swing}$ will be lower than in the hysteresis design. The lower capacitance occurs because during the writing stage, all of the pixels not being written will be in the unactuated position, resulting in less parasitic capacitance at the rows not being written. This may not be the case in a hysteresis design where some of the pixels in rows other than the row being selected can be in either the actuated or unactuated positions.

Figure 10:
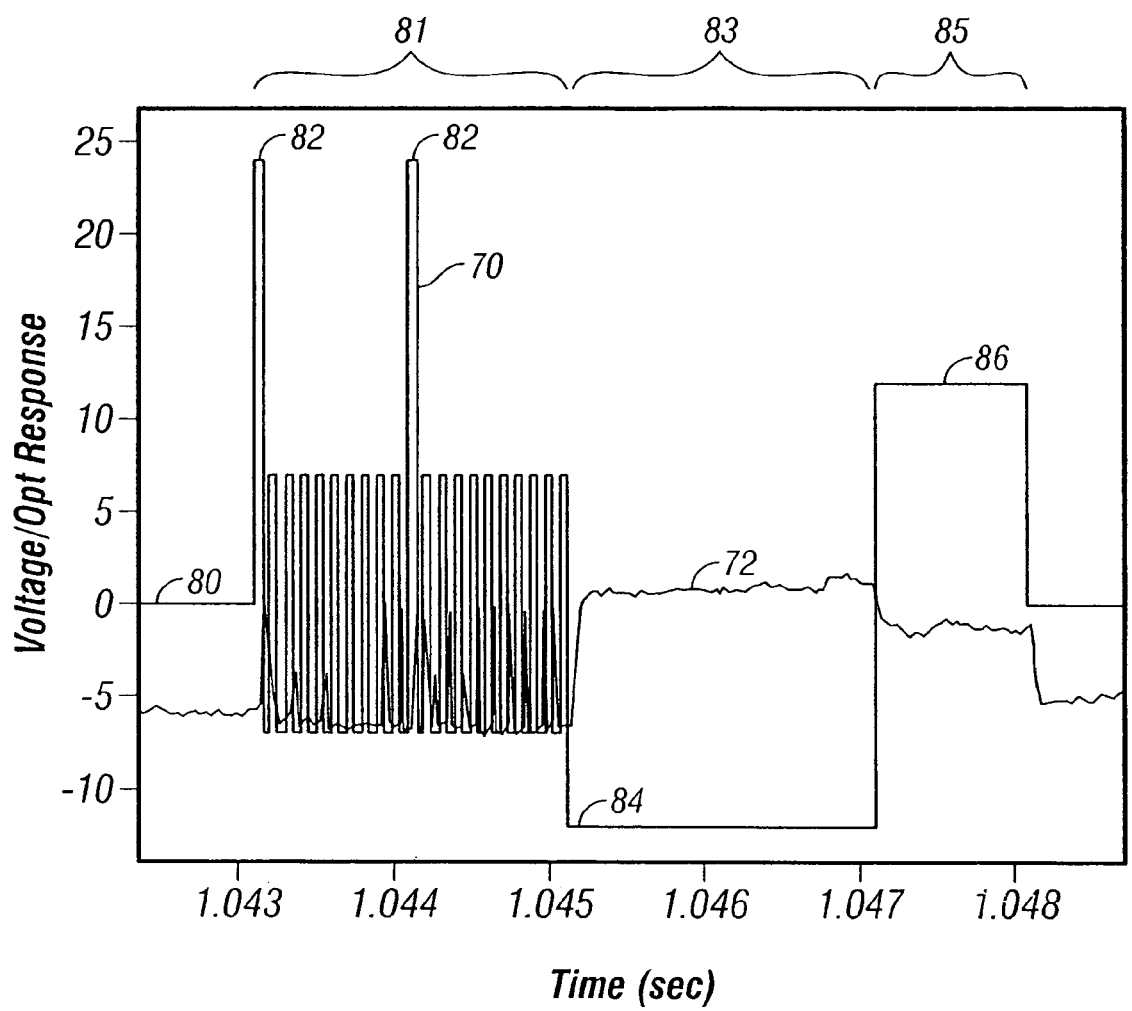
FIG. 10 is a waveform representation of the operation of a charge persistence interferometric modulator.

FIG. 10 shows a waveform representation of the operation of a charge persistence interferometric modulator addressing scheme applied to an array of interferometric modulators. The trace line 70 represents the applied voltage and the trace line 72 represents the corresponding optical response of the array. The embodiment shown uses a "double scan" for a writing stage 81 before going to a display stage 83. Reading left to right, the initial voltage 80 is at 0 V. Then, each of the two +24 V pulses 82 are applied at separate times during the writing stage 81. During the display stage 83, an opposite polarity bias 84 is held at −12 V. This is followed by a clearing voltage 86 held at +12 V during a clearing stage 85. The trace line 72 shows that the optical response is the longest and strongest during the display stage. In some embodiments, this is the only optical response portion of the cycle that is perceptible to the user or light detecting module.

When using MEMS devices as described herein to create a video display module, it is sometimes advantageous to use multiple MEMS devices to create a single pixel. The MEMS devices of a single pixel can be configured so that different MEMS devices can produce different colors or different intensities. In this way, a single pixel can produce a variety of colors, shades, and intensities depending on the instructions received from a computer processor. Alternatively, the pixels can be configured to generate only a single color or a single intensity where cost savings, energy savings, reliability, or simplicity is more important than the versatility of a multi-color and/or multi-intensity display.

Figure 11:
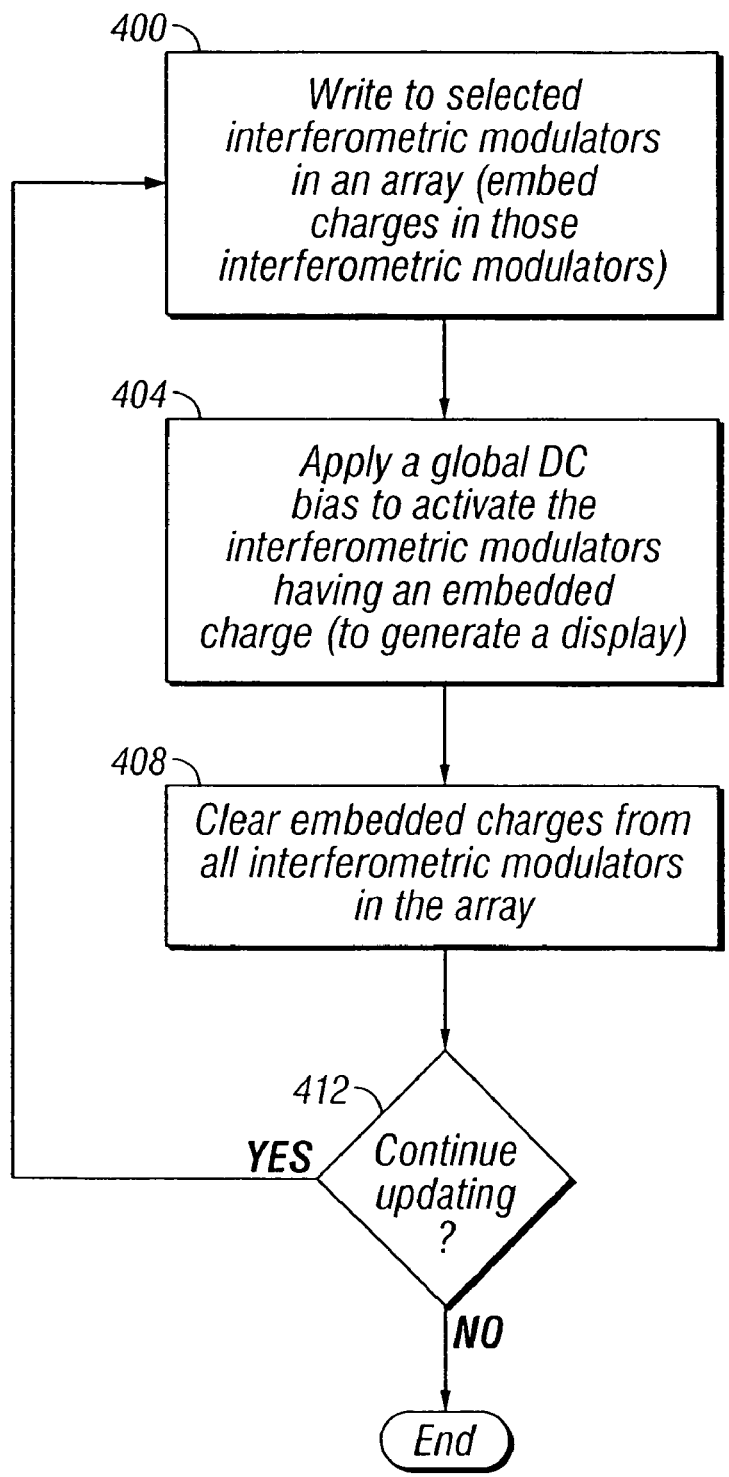
FIG. 11 is a flow chart showing a process of generating an output on a video display module.

FIG. 11 is a flow chart showing a process for generating a display on an array of interferometric modulators. The first step 400, corresponds to a writing stage in which a processor, or other instruction source, writes to selected interferometric modulators in an array by embedding charges in the dielectric stacks of those interferometric modulators to significantly lower their actuation thresholds. The location of the selected interferometric modulators corresponds to a desired display, such as text or images. Once all of the selected interferometric modulators contain an embedded charge, the process moves to step 404, wherein a global DC bias is applied to actuate those interferometric modulators having an embedded charge. This step corresponds to a displaying stage in which a global DC bias is applied having an opposite polarity to that which was used in the writing stage, and having a magnitude greater than the significantly lowered actuation threshold of the selected elements, and less than the unaltered actuation threshold of the unselected elements. The interferometric modulators that contain an embedded charge will actuate and generate the desired display. Advantageously, this display should be held on the screen long enough for a user or a light detecting module to perceive it.

The process next moves to step 408, where the embedded charges are cleared from all interferometric modulators in the display. This is done by applying a clearing signal, such as a short, large amplitude negative potential pulse; a short, large amplitude positive potential pulse followed by a short, large amplitude negative pulse; and/or a short AC waveform toggling between a large positive and negative potential. The process repeats to refresh the image on the display. Refreshing or updating the display can be advantageous in applications where it is desirable to show changes in data or text on the screen, or to show changing images sequentially to create an illusion of movement.

The process moves to step 412 where a decision is made as to whether or not to continue updating the image. If updating is necessary the process returns to step 400, and if not the process ends. Those of skill in the art will appreciate that additional steps or alternative steps can be used without departing from the spirit of the invention.

In some embodiments, it is advantageous to reduce the actuation time of the interferometric modulators so the scan time can be as short as possible, and to deliver the waveforms uniformly and cleanly across the array. One useful technique for achieving this is to shorten the resistor/capacitor (RC) time as much as possible by making sure the conductivity along the rows and columns is high. In some embodiments, the RC time is less than 2 microseconds for both the rows and columns.

An interferometric modulator may be made to include a dielectric having substantial susceptibility to acquiring charge from the reflective layer when the reflective layer makes contact with or is sufficiently close to the dielectric. The interferometric behavior of such interferometric modulators can be manipulated by briefly actuating the reflective layer so that charge is transferred to and embedded in the dielectric. The embedded charge reduces the actuation voltage of the interferometric modulator, so that the subsequent application of a display voltage can be done with a lower voltage than would be needed without the embedded charge. This lower voltage results in lower power operation. These types of interferometric modulators may be used to create display arrays, which operate with lower power requirements.

While the above detailed description has shown, described, and pointed out novel features as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. An electromechanical interferometric device comprising:
    means for altering a state of the device, the state being based on an actuation threshold; and
    means for shifting the actuation threshold to one of a plurality of functional differentiatable actuation thresholds by actuating the device, wherein the actuation threshold shifting means comprises a driving circuit.

2. The device of claim 1, wherein the state altering means comprises:
    an electrode;
    a dielectric layer coupled to the electrode, the dielectric layer comprising at least a substantially trappy surface; and
    a movable reflective layer extending over the dielectric layer so as to form a cavity therebetween, the movable reflective layer being configured to contact the dielectric if an electrical potential between the electrode and at least a portion of the movable reflective layer is greater than the actuation threshold.

3. The device of claim 2, wherein the dielectric comprises at least one of silicon nitride, silicon dioxide, aluminum oxide, and titanium dioxide.

4. The device of claim 2, wherein the dielectric layer is configured to maintain the transferred charge for a period of time exceeding 100 ms after contact between the movable reflective layer and the dielectric layer is broken.

5. The device of claim 1, further comprising means for modulating light.

6. The device of claim 5, wherein the modulating means comprises an interferometric cavity.

7. The device of claim 5, further comprising means for connecting the device to additional light modulating means of an array.

8. The device of claim 7, wherein the connecting means comprises row and column electrodes.

9. The device of claim 7, wherein the device is configured to display an image.

10. An electromechanical device comprising:
    an electrode;
    a dielectric layer coupled to the electrode, the dielectric layer comprising at least a substantially trappy surface; and
    a movable reflective layer extending over the surface of the dielectric layer so as to form a cavity therebetween, the movable reflective layer being configured to contact the dielectric if an electrical potential between the electrode and at least a portion of the movable reflective layer is greater than an actuation threshold,
    wherein when the movable reflective layer contacts the dielectric layer charge is transferred between the movable reflective layer and the dielectric layer to significantly change the actuation threshold,
    wherein the device comprises an interferometric light modulator configured to be connected to additional interferometric light modulators of an array.

11. The device of claim 10, wherein the array is configured to display an image.

12. The device of claim 10, wherein the dielectric layer is configured to maintain the transferred charge for a period of time exceeding 100 ms after contact between the movable reflective layer and the dielectric layer is broken.

13. The device of claim 10, wherein when the movable reflective layer contacts the dielectric layer the actuation threshold is changed to one of a plurality of functional differentiatable actuation thresholds.

14. An electromechanical interferometric device comprising:
    means for altering a state of the device, the state being based on an actuation threshold;
    means for significantly altering the actuation threshold to one of a plurality of functional differentiatable actuation thresholds by actuating the device;
    means for modulating light; and
    means for connecting the device to additional light modulating means of an array.

15. The device of claim 14, wherein the connecting means comprises row and column electrodes.

16. The device of claim 14, wherein the device is configured to display an image.

17. A method of manufacturing an electromechanical interferometric device, the method comprising:
    forming an electrode;
    forming a dielectric layer comprising at least a substantially trappy surface, the dielectric layer being coupled to the electrode;
    forming a movable reflective layer over the dielectric layer so as to establish a cavity therebetween, the movable reflective layer being configured to contact the dielectric layer if an electrical potential between the electrode and at least a portion of the movable reflective layer is greater than an actuation threshold, and to transfer charge to the dielectric layer upon such contact; and
    configuring the electrode and the movable reflective layer to be connected to additional MEMS devices of an array.

18. The method of claim 17, further comprising configuring the array to display an image.

19. The device of claim 17, further comprising configuring the dielectric layer to maintain the transferred charge for a period of time exceeding 100 ms after contact between the movable reflective layer and the dielectric layer is broken.

* * * * *

UNITED STATES PATENT AND TRADEMARK OFFICE
CERTIFICATE OF CORRECTION

| | |
|---|---|
| PATENT NO. | : 7,667,884 B2 |
| APPLICATION NO. | : 11/586800 |
| DATED | : February 23, 2010 |
| INVENTOR(S) | : Clarence Chui |

It is certified that error appears in the above-identified patent and that said Letters Patent is hereby corrected as shown below:

Title Page (Item 57), Line 1, change "iterferometric" to --interferometric--.

Page 4 (Item 56), Line 35, under Other Publications, change "MIT-S" to --MTT-S--.

Column 1, Line 25, change "and or" to --and/or--.

Column 6, Line 64, change "ore" to --or--.

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,667,884 B2  
APPLICATION NO. : 11/586800  
DATED : February 23, 2010  
INVENTOR(S) : Clarence Chui It is certified that error appears in the above-identified patent and that said Letters Patent is hereby corrected as shown below:

Claim 1, Column 15, line 37, change "differentiatable" to --differentiable--.

Claim 13, Column 16, lines 29-30, change "differentiatable" to --differentiable--.

Claim 14, Column 16, line 36, change "differentiatable" to --differentiable--.

Signed and Sealed this  
Eleventh Day of October, 2011

David J. Kappos  
*Director of the United States Patent and Trademark Office*